(12) United States Patent
Kumta et al.

(10) Patent No.: US 11,575,127 B2
(45) Date of Patent: Feb. 7, 2023

(54) HIGH CAPACITY, AIR-STABLE, STRUCTURALLY ISOMORPHOUS LITHIUM ALLOY MULTILAYER POROUS FOAMS

(71) Applicant: UNIVERSITY OF PITTSBURGH—OF THE COMMONWEALTH SYSTEM OF HIGHER EDUCATION, Pittsburgh, PA (US)

(72) Inventors: Prashant N. Kumta, Pittsburgh, PA (US); Bharat Gattu, Pittsburgh, PA (US); Moni Kanchan Datta, Pittsburgh, PA (US); Oleg Velikokhatnyi, Pittsburgh, PA (US); Pavithra Murugavel Shanthi, Pittsburgh, PA (US); Prashanth Jampani Hanumantha, Pittsburgh, PA (US)

(73) Assignee: UNIVERSITY OF PITTSBURGH—OF THE COMMONWEALTH SYSTEM OF HIGHER EDUCATION, Pittsburgh, PA (US)

(*) Notice: Subject to any disclaimer, the term of this patent is extended or adjusted under 35 U.S.C. 154(b) by 153 days.

(21) Appl. No.: 16/628,880

(22) PCT Filed: Jul. 9, 2018

(86) PCT No.: PCT/US2018/041210
§ 371 (c)(1),
(2) Date: Jan. 6, 2020

(87) PCT Pub. No.: WO2019/010476
PCT Pub. Date: Jan. 10, 2019

(65) Prior Publication Data
US 2020/0227736 A1   Jul. 16, 2020

Related U.S. Application Data

(60) Provisional application No. 62/529,588, filed on Jul. 7, 2017.

(51) Int. Cl.
*H01M 4/36* (2006.01)
*H01M 4/134* (2010.01)
(Continued)

(52) U.S. Cl.
CPC ........ *H01M 4/366* (2013.01); *H01M 4/134* (2013.01); *H01M 4/1395* (2013.01);
(Continued)

(58) Field of Classification Search
CPC ......................... H01M 4/0459; H01M 4/382
See application file for complete search history.

(56) References Cited

U.S. PATENT DOCUMENTS

| 2002/0012846 A1 | 1/2002 | Skotheim et al. |
| 2015/0072236 A1 | 3/2015 | Um et al. |

(Continued)

FOREIGN PATENT DOCUMENTS

WO    2016145429 A1    9/2016

OTHER PUBLICATIONS

Hanumantha et al., Engineering Solutions to Dendrite Formation in Lithium Anode Based Batteries, Meeting Abstract (May 29, 2017), Abstract.
(Continued)

*Primary Examiner* — Stephan J Essex
(74) *Attorney, Agent, or Firm* — Carol A. Marmo; Eckert Seamans Cherin & Mellott, LLC (57) ABSTRACT

The invention relates to composite multilayer lithium ion battery anodes that include a porous metal alloy foam, and a lithium ion conductor coating applied to the metal alloy
(Continued)

foam. The metal alloy foam can include structurally isomorphous alloys of lithium and, optionally, lithium and magnesium. The lithium ion conductor coating can include ternary lithium silicate, such as, lithium orthosilicate. Lithium ions from the ternary lithium silicate may be deposited within the pores of the metal alloy foam. Optionally, the lithium ion conductor coating may include a dopant. The dopant can include one or more of magnesium, calcium, vanadium, niobium and fluorine, and mixtures and combinations thereof.

11 Claims, 8 Drawing Sheets (51) Int. Cl.
| | | |
|---|---|---|
| H01M 4/1395 | (2010.01) | |
| H01M 4/40 | (2006.01) | |
| H01M 4/62 | (2006.01) | |
| H01M 4/66 | (2006.01) | |
| H01M 4/80 | (2006.01) | |
| H01M 10/0525 | (2010.01) | |
| H01M 4/02 | (2006.01) | |

(52) U.S. Cl.
CPC .......... *H01M 4/405* (2013.01); *H01M 4/628* (2013.01); *H01M 4/662* (2013.01); *H01M 4/808* (2013.01); *H01M 10/0525* (2013.01); *H01M 2004/027* (2013.01)

(56) References Cited

U.S. PATENT DOCUMENTS

2017/0098856 A1    4/2017  Zhamu et al.
2017/0352868 A1*  12/2017  Zhamu ................. H01M 4/133

OTHER PUBLICATIONS

Kumta, New Lamination and Doping Concepts for Enhanced Lithium—Sulfur Battery Performance (Jun. 6, 2016), Slide 21-23. <https://www.energy.gov/sites/prod/files/2016/06/f32/es279_kumta_2016_p_web.pdf>.
Shanthia et al., Doped Lithium Orthosilicates—Promising High Rate Lithium-Ion Conductors for Li-S Batteries, Meeting Abstract (Jun. 6, 2016), Abstract.
International Search Report and Written Opinon for PCT/US2018/041210, dated Oct. 4, 2018.

* cited by examiner

HIGH CAPACITY, AIR-STABLE, STRUCTURALLY ISOMORPHOUS LITHIUM ALLOY MULTILAYER POROUS FOAMS

CROSS-REFERENCE TO RELATED APPLICATIONS

This application is a U.S. National Stage Application under 35 U.S.C. § 371 of International Patent Application No. PCT/US2018/041210, filed on Jul. 9, 2018, entitled "HIGH CAPACITY, AIR-STABLE, STRUCTURALLY ISOMORPHOUS LITHIUM ALLOY MULTILAYER POROUS FOAMS", which claims priority under 35 U.S.C. § 119(e) to United States Provisional Patent Application Ser. No. 62/529,588, filed Jul. 7, 2017, entitled "HIGH CAPACITY, AIR-STABLE, STRUCTURALLY ISOMORPHOUS LITHIUM ALLOY (SIA), MULTILAYER POROUS FOAMS (MPFs) AND COMPOSITE MULTILAYER ANODES (CMAs) CONFIGURATIONS FOR DENDRITE-FREE LITHIUM METAL ANODES FOR Li-ION BATTERIES", which are herein incorporated by reference.

GOVERNMENT SUPPORT AND FUNDING

The invention was made with government support under CBET1511390 awarded by the National Science Foundation and DE-EE0006825 awarded by the Department of Energy. The government has certain rights in the invention.

FIELD OF THE INVENTION

The invention generally relates to lithium metal anodes and, more particularly, to isomorphous lithium alloys, and multilayer composites thereof, for use in lithium ion batteries to mitigate or preclude the formation of lithium dendrites and volumetric changes associated with plating/deplating of large volumes of lithium.

BACKGROUND OF THE INVENTION

Various technological advancements, such as, the development of various mobile applications, depend on the amount of energy that can be carried onboard. For example, it is typical for electric cars to run for 100-300 miles and cell phones to be in use for 24 hours or less, before the batteries need to be charged. Improvements in energy storage capacity per unit mass/volume is needed to expand the limits of these technologies. Lithium has shown to be an ideal ion for shuttling in a battery electrolyte system. However, electrolyte breakdown, volumetric change and dendrite formation resulting in cell-shorting during cycling are major problems associated with the use of lithium metal anodes (LMA).

It is known that the use of lithium metal anodes (LMA) for battery applications is largely hindered by the massive volumetric change and inhomogeneous nucleation associated with lithium plating/deplating processes. This process inevitably results in the formation of sharp structures with high local current densities, referred to as lithium dendrites. These sharp structures tend to act as growth sites. Thus, large lithium dendritic structures are often responsible for cell shorting and eventual failure due to separator puncture. Dendrite formation in lithium has been seen as a major stumbling block halting the progress and commercialization of high energy battery systems, such as lithium-sulfur and lithium-air batteries.

In addition, the loss of coulombic efficiency as a result of lithium reacting with electrolyte (on account of high local current densities) results in the formation of solid electrolyte interphase (SEI) (a passivating layer), which is also known to occur.

There is a considerable effort in the development of all solid-state electrolytes as a replacement to traditional liquid electrolyte used in current lithium ion batteries (LIBs). These solid-state electrolytes should meet the high ionic conductivity demands along with low leakage currents, as well as provide a wide electrochemical operating window and chemical compatibility with electrodes. The materials also require an easy manufacturing procedure that is environmentally friendly to facilitate scalability.

Research focused on solid electrolytes has identified various different classes of materials that partially satisfy the above demands. Single crystalline, polycrystalline and amorphous ceramics are found to exhibit good Li-ion conductivity. These solid electrolytes generally contain monovalent protons, divalent ions, lithium and/or fluoride ions. These ceramic compounds conduct ions by the movement of ionic point defects, the creation and movement of which requires energy. As a result, the conductivity of these compounds increases with increased temperature. However, ionic conduction in some compounds is reasonably high even at relatively low temperatures, so several types of lithium-ion conducting inorganic ceramic sulfides, phosphates and oxides have been investigated for use in lithium-ion batteries.

Phosphate based inorganic ceramic electrolytes of LIPON and NASICON-like compounds exhibit a wide electrochemical stability window and are chemically compatible with lithium electrodes. But, the conductivity of these compounds is low ($\sim 10^{-6}$ S cm$^{-1}$) at room temperature. Sulfide-based ceramic ionic conductors fall under the $Li_2S$—$Li_2P_5$ and the LiSICON class of compounds. On the other hand, $Li_{10}GeP_2S_{12}$ (LGPS), and different variants of the superionic conductor, have a reported ionic conductivity of $\sim$12 mS cm$^{-1}$ at room temperature that rivals many liquid electrolytes, and appears to be stable over a relatively wide operating voltage range. However, the expensive nature of germanium, the hygroscopic nature and the rapid decomposition of these sulfides upon exposure to atmospheric moisture forming toxic $H_2S$ gas restricts handling of these materials in ambient air. The perovskite $(La,Li)TiO_3$ (LLTO) and garnet oxides based on $Li_5La_3Ta_2O_{12}$ are promising solid ionic conductors. However, these oxides have a tedious, cumbersome and comprehensive synthesis procedure that poses serious scalability issues.

The most primitive and age-old solid lithium ion conductor is $Li_4SiO_4$ and its derivatives. The unit cell of $Li_4SiO_4$ contains two $SiO_4^{-4}$ tetrahedra linked by eight lithium ions, which are distributed over 18 possible sites. The conductivity of pure $Li_4SiO_4$ is rather low ($\sim 10^{-12}$ S cm$^{-1}$) at room temperature. A three to four orders of magnitude improvement in ionic conductivity could be obtained by forming simple solid solutions with $Li_3PO_4$ at 100° C. with no significant improvement in room temperature ionic conductivity. The advantage of these oxide-based compounds are their compatibility with lithium electrodes and exceptional chemical stability under atmospheric conditions. Moreover, these oxide-based ionic conductors are compatible with commercial liquid electrolytes that contribute to the development of hetero structures, which could prevent polysulfide dissolution. Composite multilayer electrodes have been prepared using $Li_4SiO_4$ and tested in commonly used organic liquid electrolytes, which successfully demonstrated the possibility of using a layer of Lithium Ion Conductor (LIC) to prevent polysulfide from dissolving into the electrolyte solution. Although the fade rate was decreased using the LIC, the initial discharge capacity was lower than the theoretical capacity of sulfur, due to the low ionic conductivity of LIC. To improve the initial capacity of the sulfur cathodes, the conductivity of LIC needs to be further improved. Doping is a strategy that has been widely used in improving the ionic conductivity of crystals. Cation doping of $LaFeO_3$, $RbNO_3$, lanthanum silicates, $ZrO_2$ and $Li_7La_3Zr_2O_{12}$ have shown to improve the ionic conductivity of the respective compounds.

It has been demonstrated that the activation energy for lithium ion hopping is lowered by the introduction of vacancies during doping which results in an increase in the ionic conductivity. However, the room temperature ionic conductivity of $Li_4SiO_4$ is very limited necessitating the identification of novel dopants to make high ionic conductivity LIC materials for use as coatings on sulfur cathodes.

Thus, there is a need in the art to design and develop alloys and methods to effectively mitigate both dendritic growth and volumetric changes associated with plating/deplating of large volumes of lithium. The invention provides lithium-rich, structurally isomorphous alloys (SIA) with magnesium (an element of divalent ionic radius similar to that of Li-ion and Mg—Li-alloys) that are capable of undergoing lithiation/delithiation without loss in phase. Further, provided are crystallographic structures for stable dendrite-free cycling having outstanding capacities.

The highly efficient alloys and methods of the invention are effective for reversibly storing and cycling lithium absent of dendritic growth that can provide high power lithium-anode based batteries.

SUMMARY OF THE INVENTION

In one aspect, the invention provides a composite multilayer lithium ion battery anode, which includes a porous metal alloy foam; and a lithium ion conductor coating applied to the porous metal alloy foam. Wherein, growth of dendrites on the composite multilayer lithium ion battery anode is reduced as compared to a lithium battery anode absent the multilayer porous foam and lithium ion conductor coating. The porous metal alloy foam can include a structurally isomorphous alloy. The structurally isomorphous alloy may include lithium. The structurally isomorphous alloy of lithium can include a solid solution of magnesium. Furthermore, the structurally isomorphous alloy of lithium may include at least one element selected from the group consisting of zinc, aluminum, yttrium, calcium, strontium, iron, and silver.

The lithium ion conductor coating can include ternary lithium silicate. The ternary lithium silicate can be lithium orthosilicate.

The lithium ion conductor coating can optionally include a dopant. The dopant can be selected from the group consisting of magnesium, calcium, vanadium, niobium, fluorine, and mixtures and combinations thereof.

The dopant may interact with a site in the ternary lithium silicate selected from the group consisting of lithium ion, oxygen atom, silicon atom and combinations thereof. In certain embodiments, the dopant interacts with the lithium ion and the dopant is selected from the group consisting of calcium, magnesium, and mixtures and combinations thereof, or the dopant interacts with the oxygen atom and the dopant is fluorine, or the dopant interacts with the silicon atom and the dopant is selected from the group consisting of vanadium, niobium, and mixtures and combinations thereof.

In certain embodiments, lithium atoms are deposited within the pores formed in the porous metal alloy foam.

In another aspect, the invention provides a method of preparing a composite multilayer lithium ion battery anode. The method includes forming a porous metal alloy foam; applying a lithium ion conductor coating to the porous metal alloy foam; and, optionally, doping one or more sites of the lithium ion conductor coating with a dopant. Wherein the sites are selected from the group consisting of lithium ion, oxygen atom and silicon atom, and the composite effectively reduces the growth of dendrites on the composite multilayer lithium ion battery as compared to a lithium battery anode absent the multilayer porous foam and lithium ion conductor coating.

BRIEF DESCRIPTION OF THE DRAWINGS

A full understanding of the disclosed concept can be gained from the following description of the preferred embodiments when read in conjunction with the accompanying drawings:

FIG. 7, views (a)-(c) are Nyquist plots of calcium-, magnesium- and fluorine-doped $Li_4SiO_4$, and view (d) shows an equivalent circuit used to fit the impedance data, in accordance with certain embodiments of the invention.

DETAILED DESCRIPTION OF THE INVENTION

The invention relates to composite, multilayer lithium metal anodes (LMAs) for lithium ion battery applications. The LMAs are formed by porous metal alloy foam and a lithium ion conductor coating. It has been found that the LMAs in accordance with the invention are effective to mitigate or preclude dendrite formation and volumetric changes typically associated with plating/deplating of large volumes of lithium.

The porous metal alloy foam may include metal selected from a variety of suitable metals known in the art including, but not limited to, lithium, magnesium, iron, copper and the like. Thus, the porous metal alloy foam may be lithium-, magnesium-, iron-, or copper-rich or based. The porous metal alloy foam includes structurally isomorphous alloys (SIAs) of the metal. In certain embodiments, the porous metal alloy foam includes SIAs of lithium and, optionally, magnesium. In certain embodiments, the LMAs include a solid solution of magnesium that optionally has other elements present, such as but not limited to, zinc, aluminum, yttrium, calcium, strontium, silver, iron, and mixtures and combinations thereof.

The lithium ion conductor coating can include ternary lithium silicate, such as but not limited to, lithium orthosilicate.

The development of novel lithium anodes having improved properties and characteristics provides for the potential use of lithium metal-free cathodes for lithium ion battery applications. However, as aforementioned, safety concerns have been associated with the lithium anode battery systems due to lithium dendrite formation during plating/deplating and the potential for separator puncture and cell shorting, leading to thermal runaway and explosive cell failure. With respect to mitigating or precluding dendrite formation, the current density has been identified as a primary factor in dendrite nucleation and growth.

According to certain embodiments of the invention, the LMAs include Li-rich structurally isomorphous alloys (SIAs), and SIAs with magnesium. The SIA materials have a cubic lithium structure that they can maintain over a wide composition spectrum. For example, a SIA of lithium can retain its cubic structure upon removal of approximately 40% of the lithium.

The LMAs according to the invention are capable of undergoing lithiation/delithiation without loss in phase and crystal structure. Further, crystallographic structure is shown to have stable dendrite-free cycling for over 200 cycles with outstanding capacities in excess of 15 mAh/cm$^2$ (approximately 1630 mAh/g). In addition, a complete absence of dendrites is observed at current densities as high as about 16 mA/cm$^2$.

The LMAs include porous foam, which may be multilayer porous foam. In certain embodiments, the porous foam consists of a cage-like conductive structure. This structure can allow for lithium cycling without significant anode expansion-contraction. Further, the presence of the SIAs and use of alloying provide means to circumvent the dendritic structures that are nucleation- and growth-dependent. The SIAs prevent dendritic growth by adopting a non-nucleation-based mechanism. Furthermore, in accordance with the invention, a thin lithium-ion conductor coating (LIC) deposited on the porous foam contributes to preventing orthogonal growth of dendrites. Combining these approaches leads to the formation of composite multilayer anodes consisting of high surface area porous foams of SIA materials (e.g., Li alloy) coated with a thin LIC coating, resulting in specific capacities on the order of about 1600 mAh/g. As aforementioned, the porous foam can also include solid solutions of magnesium with other elements, such as, zinc, aluminum, yttrium, calcium strontium, silver, iron, and mixtures and combinations thereof. These materials and methods are effective to provide LMAs for reversibly storing and cycling lithium with no dendritic growth.

In certain embodiments, the solid lithium ion conductor includes a ternary lithium silicate, such as lithium orthosilicate ($Li_4SiO_4$). The unit cell, e.g., crystal structure, of $Li_4SiO_4$ contains two $SiO_4^{-4}$ tetrahedra linked by eight lithium ions, which are distributed over 18 possible sites. The conductivity of pure $Li_4SiO_4$ is rather low at room temperature and therefore, optionally, doping is employed to improve its conductivity. For example, doped $Li_4SiO_4$ can provide LIC materials having high ionic conductivity for use as coatings on sulfur cathodes. Various conventional/traditional doping techniques are known in the art for improving the ionic conductivity of crystals. Using suitable doping techniques, such as a facile solid diffusion technique, a dopant is employed to interact with a corresponding site of the $Li_4SiO_4$. The dopant can interact with the lithium ions and/or the silicon atoms and/or the oxygen atoms of the $Li_4SiO_4$. Suitable dopants include magnesium, calcium, vanadium, niobium, fluorine, and mixtures and combinations thereof. For interaction with the lithium ions, the dopant can be calcium, magnesium, or mixtures or combinations thereof. For interaction with the silicon atoms, the dopant can be vanadium and/or niobium. For interaction with the oxygen atoms, the dopant can be fluorine.

The lithium ion conductor coating is applied or deposited on a surface of the porous metal alloy foam. However, it is contemplated and understood according to the invention that there may be in-pore lithium ion deposition, i.e., lithium ions may be deposited within the pores that are formed in the porous metal alloy foam when the lithium ion conductor coating is applied or deposited thereon.

Without intending to be bound by any particular theory, it is believed that the presence of the lithium ion conductor coating is effective to mitigate or preclude nucleation and orthogonal growth of dendrites during the charge/discharge cycling of a lithium ion battery to improve the electrochemical performance. Further, it is believed that the in-pore lithium deposition may ensure non-uniform nucleation and growth of lithium leading to coalescence within the pore, preventing dendritic growth perpendicular to the separator and resulting in puncture and eventual failure due to shorting of the cells.

In certain embodiments, the composite multilayer lithium ion battery anode is prepared by forming a porous metal alloy foam and depositing a lithium ion conductor coating on the porous metal alloy foam. As described herein, the foam can include a SIA of a metal, such as but not limited to lithium alloy and optionally magnesium, with a solid solutions of magnesium having one or more other elements, e.g., one or more of zinc, aluminum, yttrium, calcium, strontium, iron and silver. The lithium ion conductor coating includes a ternary lithium silicate, e.g., lithium orthosilicate, and optionally a dopant. The porous metal alloy foam can be deposited on a metal current collector. A wide variety of metals are known in the art for use as current collectors, including but not limited to, copper and stainless steel. The lithium ion conductor coating may be deposited as a thin film. The thickness varies, and may be about one micron thick.

In certain embodiments, the SIA alloy can be synthesized by employing high-energy milling followed by a corresponding heat treatment.

The invention provides at least the following advantages as compared to known lithium ion battery anode materials:
  Mitigation or preclusion of dendrite formation on a lithium anode for the production of a safe lithium ion battery;
  Use of multilayer porous foams to allow for controlled nucleation of SEI, which provides for improved columbic efficiency and correspondingly improved electrochemical cycling;
  Use of structurally isomorphous electrodes to provide high capacity Li electrodes (approximately 1627 mAh/g) absent of visible dendrite formation;
  SIA electrodes that show initial overpotential potentially as a result of surface segregation; and
  High rate SIA electrodes that demonstrate negligible formation of dendritic structures.

It should be understood that the embodiments described herein and the examples above are for illustrative purposes only and that various modifications or changes in light thereof will be suggested to persons skilled in the art and are to be included within the spirit and purview of this application.

EXAMPLES

The crystal structure of $Li_4SiO_4$ and doping strategies that may improve the room-temperature ionic conductivity were evaluated. Using Density Function Theory (DFT), the effect of several monovalent and divalent cations and anions on the $Li^+$ conductivity of the crystal and suitable dopant elements were identified. Cation and anion doping of $Li_4SiO_4$ was performed to obtain final crystals of the chemical formula shown by i and ii, as follows:

$(Li_y[\ ]_xX_x)_4SiO_4$, where X—Ca, Mg, [ ]—vacancy, x—0.025 to 0.15; and  i.

$Li_4Si(O_y[\ ]_xF_x)_4$, where F—Fluorine, [ ]—vacancy, x—0.025 to 0.15.  ii.

Lithium orthosilicate was doped with six different concentrations of each of the dopants using a facile solid diffusion technique. Electrochemical Impedance Spectroscopy (EIS) analysis results showed that doping improved the ionic conductivity of $Li_4SiO_4$ by three to four orders. $Ca^{2+}$ doping showed the maximum improvement in ionic conductivity from $1.179 \times 10^{-12}$ S $cm^{-1}$ to $2.870 \times 10^{-8}$ S $cm^{-1}$.

I. Computational Methodology

Figure 1:
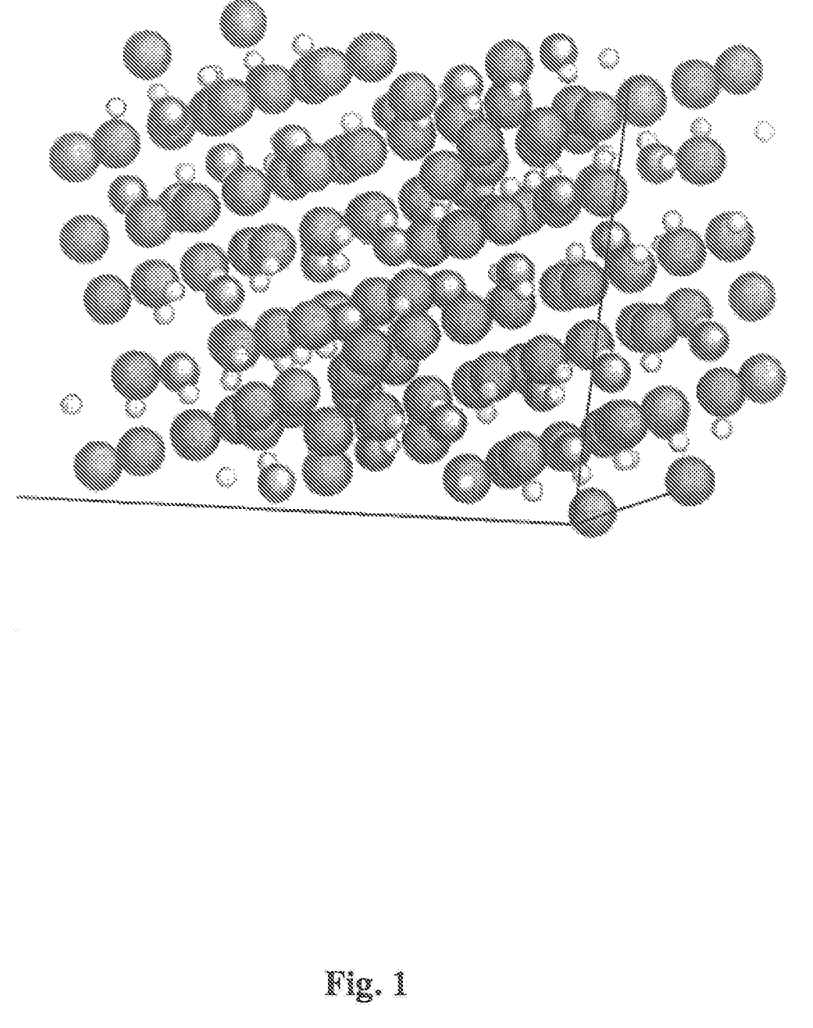
FIG. 1 is a schematic showing the unit cell of $Li_4SiO_4$ crystal structure, wherein the large balls represent Si, the medium balls represent O, and the small balls represent Li.

A. Crystal Structure $Li_4SiO_4$ is a complex ternary lithium silicate with monoclinic symmetry and space group P21/m. It contains 14 formula units (56 Li, 14 Si, and 56 O atoms) with the following lattice parameters: a=11.546 Å, b=6.090 Å, c=16.645 Å, and β=99.5°, as shown in FIG. 1. The 126 atom crystal structure has isolated $SiO_4$ tetrahedra and Li atoms positioned there around.

For calculating the total energies, electronic structure, and density of electronic states of the materials, the DFT implemented in the Vienna Ab-initio Simulation Package (VASP) was used within the projector-augmented wave (PAW) method and the spin-polarized generalized gradient approximation (GGA) for the exchange-correlation energy. The standard PAW potentials were utilized for the elemental components and the Li, Si, O, Mg, Ca, V, Nb, and F potentials thus contained one, four, six, two, two, five, eleven and seven valence electrons, respectively. In the present theoretical analysis, to maintain high precision for the total energy calculations for all the electro-catalyst compositions, the plane wave cutoff energy of 520 eV was selected. By employing the double relaxation procedure, the internal positions as well as the lattice parameters of atoms were completely optimized.

The minima of the total energies with respect to the lattice parameters and internal ionic positions were also determined. By minimizing the Hellman-Feynman forces via a conjugate gradient method, geometry optimization was achieved. This caused the net forces applied on every ion in the lattice to be near zero. The total electronic energies were converged within $10^{-5}$ eV/un cell, which resulted in the residual force components on each atom being lower than 0.01 eV/Å/atom. This allowed an accurate determination of the internal structural parameters. The Monkhorst-Pack scheme was used to sample the Brillouin Zone (BZ) and create the k-point grid for the solids and the different isolated atoms used. The selection of an appropriate number of k-points in the irreducible part of the BZ was made on the grounds of the convergence of the total energy to 0.1 meV/atom. The climbing-image nudged elastic band (CNEB) method also implemented in VASP was used to determine the diffusion pathways and migration barriers of $Li^+$-ions in the $Li_4SiO_4$ crystal structure.

B. Electronic Structure

Figure 2:
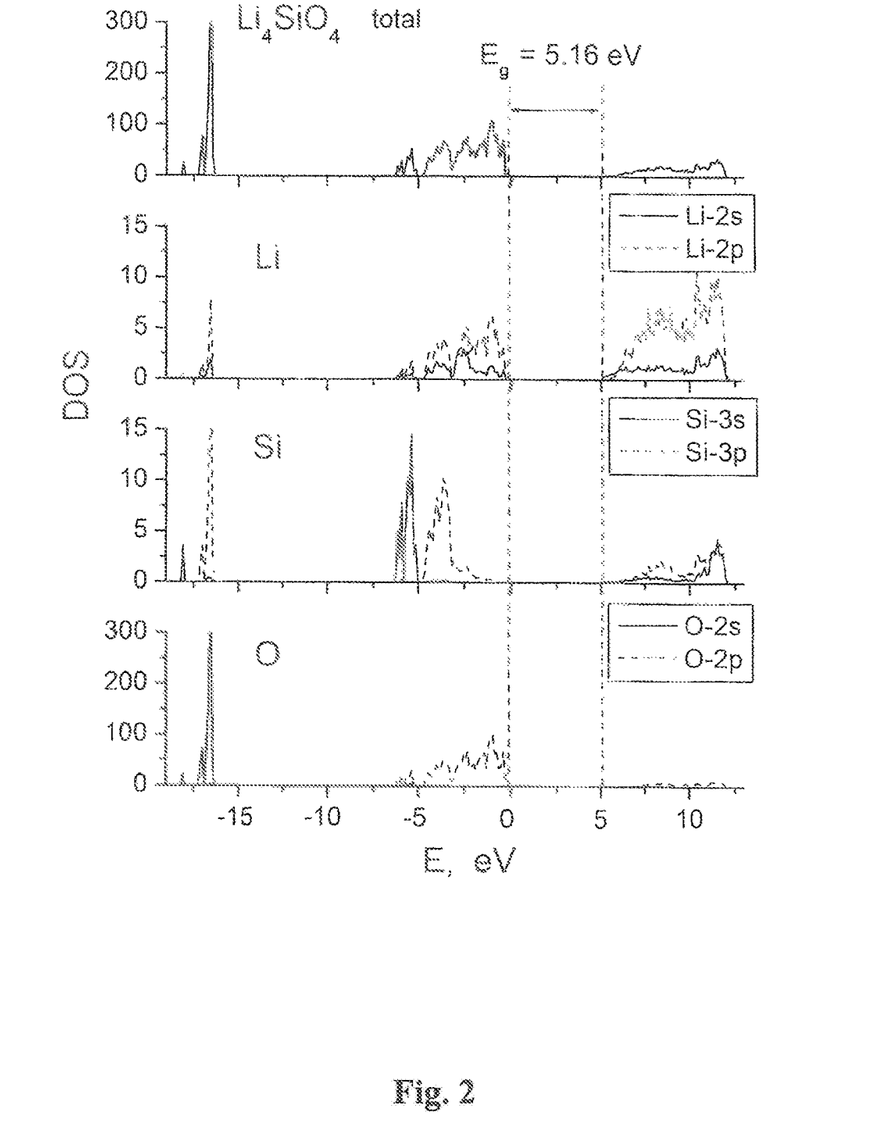
FIG. 2 is an image showing electronic density of states of $Li_4SiO_4$ wherein zero energy corresponds to Fermi level.

The electronic structure of $Li_4SiO_4$ was considered. FIG. 2 demonstrates the calculated total and projected density of valence electronic states with the Fermi energy set to zero. It was observed that $Li_4SiO_4$ bulk ground properties were mainly determined by the 2p orbital electrons of oxygen atoms. 3s and 3p bands of silicon atoms were slightly overlapped with each other and strongly hybridized with 2p states of oxygen causing covalency in this material. Strong peaks occurred at −1.1, −2.5, −3.7 and −5.2 eV in the upper valence band while the lower valence band contained peaks at −16.8, −17.1, and −18.0 eV. The −1.1 and −2.5 eV peaks mainly resulted from the contributions of O 2p, Li 2s and Li 2p orbitals, −3.7 eV peak came from the O 2p, Si 3p and Li 2s orbital, while −5.2 eV was composed of O 2p, Si 3s and Li 2p orbital. A strong peak at −16.8 eV resulted from the contribution of O 2s, Si 3p and Li 2p, while peaks at −17.1 and −18.0 eV came from O 2s and Si 3s states.

The conduction band mainly consisted of Li 2s, 2p orbitals hybridized with Si 3s, 3p states and separated from the upper valence band with band gap of 5.16 eV. This value could not be considered accurate due to the well-known inability of the density functional methods to accurately predict band gaps in semiconductors and insulators with systematic underestimation on an average of 30-50%. However, this shortcoming was not critical in this experiment since the goal was to predict the general trends in ionic conductivity, and therefore, the calculated value was considered satisfactory.

C. Ionic Mobility of Pure $Li_4SiO_4$

To estimate Li-ion conductivity, various pathways of the Li-ions during propagation through the bulk of the materials were considered. It was assumed that Li-diffusion occurs by means of hopping mechanism from the occupied Li-site to the neighbor Li-vacancy. The activation energy barriers for the various hops between fixed Li-ion vacancy and different closest Li-ions in the crystal lattice were calculated. The Li-diffusion coefficient was expressed as follows:

$$D(T) = a^2 v^* \exp[-E_a/k_b T] \quad (1)$$

wherein D is the diffusion coefficient, a is the hopping distance (~3.0 Å in this case), v* is the hopping frequency (~$10^{13}$ $s^{-1}$).

Figure 3:
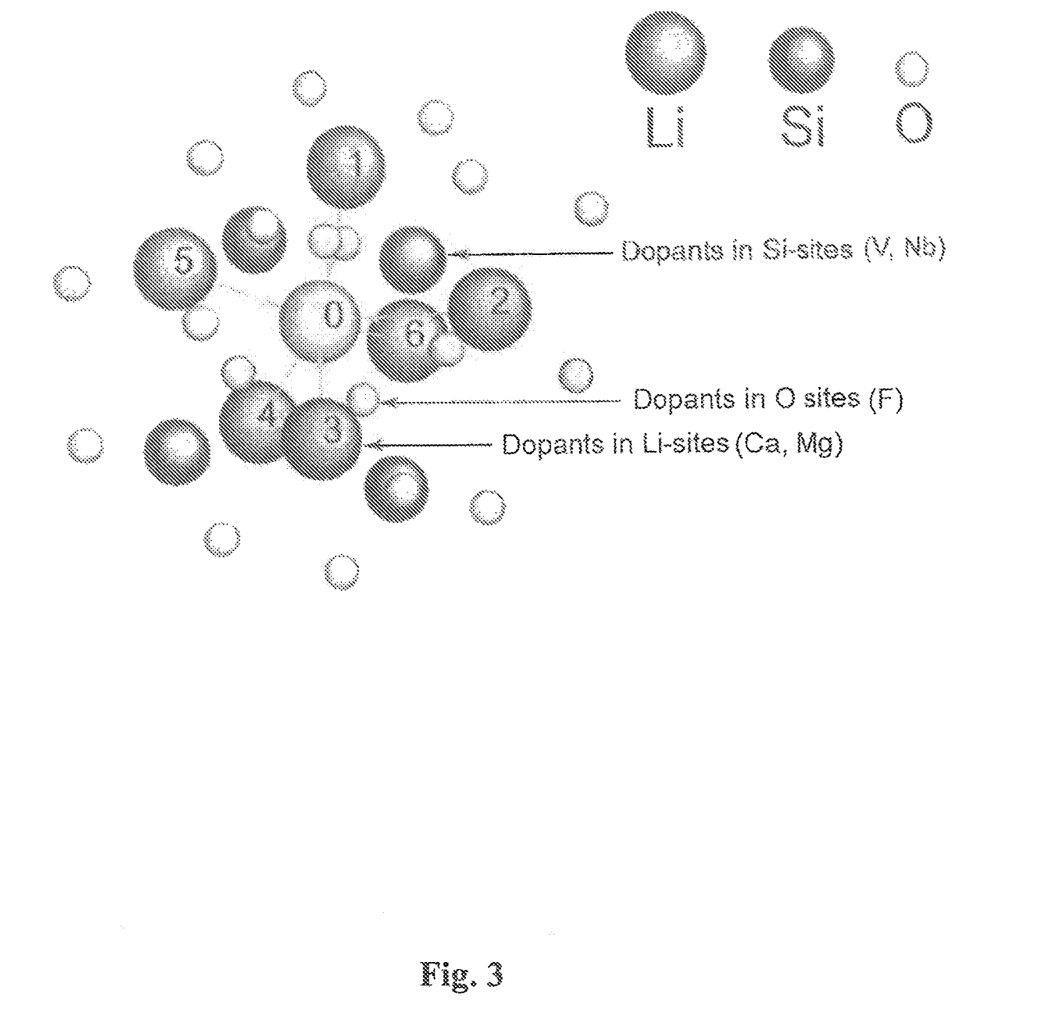
FIG. 3 is a schematic showing Li-vacancy and vicinity.

FIG. 3 shows Li-vacancy in the center marked with zero and the six closest Li-ions from which the six different hops were considered to the central fixed vacancy. Also shown are silicon and oxygen atoms in the vicinity of the Li-vacancy.

Each pathway was divided into eight equal parts reflecting intermediate positions of the Li-ion hopping between occupied and vacant lattice sites. The total energies of the distorted crystal structures were calculated for all the nine consecutive intermediate images where each image was relaxed until the maximum residual force was less than 0.1 meV/A. The energy difference between the initial configuration and the maximum energy obtained for an intermediate position of the specific pathway was considered as an activation barrier $E_a$ for each of the six possible hopping ways shown in FIG. 3.

Figure 4:
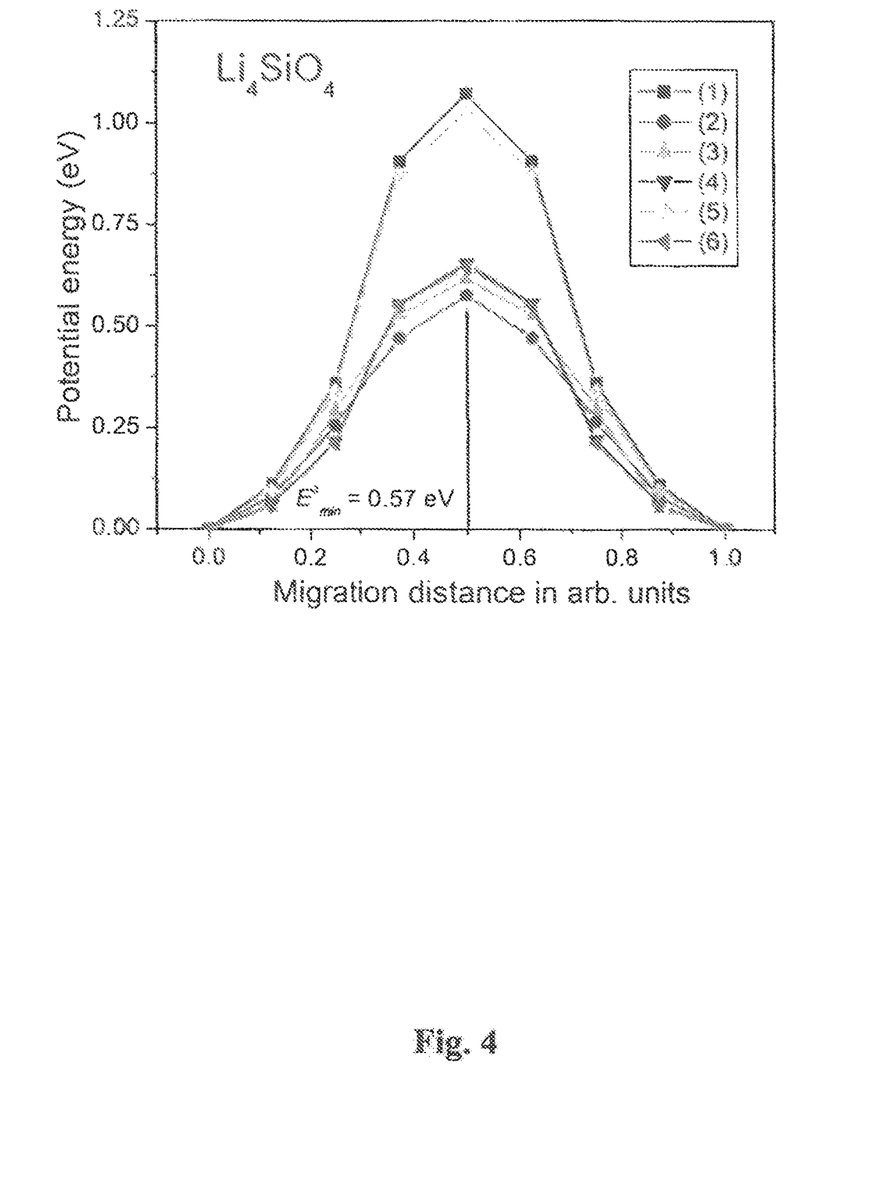
FIG. 4 is a plot that shows potential energy for different migration paths of Li-ions in pure $Li_4SiO_4$.

The calculated potential energies for different pathways in pure $Li_4SiO_4$ are shown in FIG. 4. Depending on the pathways between initial and final locations of Li-ion, the resultant activation barrier values $E_a$ varied between 0.57 eV and 1.07 eV. This occurred due to the fact that all six pathways shown on FIG. 3 are symmetrically non-equivalent, although to different extents. For example, Li-ion following paths 1 and 5 jumped between the two adjacent oxygen ions moving them apart which demanded an appreciable amount of energy resulting in the activation barriers around 1.1 eV for both pathways. In contrast, paths 2, 3, 4, and 6 did not go through the narrow spaces between two oxygen ions, but only enveloped one oxygen ion which was more energetically favorable as compared to paths 1 and 5. This provided support for the presence of two groups of pathways characterized by substantially different barriers $E_a$ shown in FIG. 4.

The calculated $E_a$ values allowed for determining the most favorable pathways for Li-migration, requiring minimal energy dispensation for hopping between adjacent Li-ion sites. For the particular atomic configuration shown on FIG. 3, there were four paths with similar activation barrier values laying between 0.57 eV and 0.65 eV which was within computational error of the model used. Thus, $E_a$=0.6 eV was chosen as a reasonable value for estimation of the diffusion coefficient for pure $Li_4SiO_4$. From Equation 1 at room temperature T=~300° K the diffusion coefficient was calculated to be ~7.2×10$^{-13}$ cm$^2$/s. This value was then compared with corresponding numbers for the ionic mobility in doped $Li_4SiO_4$.

D. Ionic Mobility of $Li_4SiO_4$ with Ca, Mg, V, Nb, and F

As aforementioned, doping with different aliovalent elements may contribute to creating ionic vacancies in the crystal structure of the material, thus facilitating Li migration and improving the overall ionic conductivity. This is a consideration for enhancing the conductivity since the more open is the crystal structure, the higher is the resulting ionic mobility expected in the material. Alternatively, the presence of additional elements may reduce the Li-ion mobility due to larger ionic sizes and increased electric charges in the vicinity of the doping elements. Qualitative evaluation of these factors and their effects on the overall Li-ion mobility and ionic conductivity was useful in the identification and selection of the suitable doping elements for achieving high Li-ion conductive materials.

FIG. 3 shows atoms in the $Li_4SiO_4$ structure which were substituted with different elements. Ca and Mg were placed at the Li-type sites, while V and Nb were placed at the Si-sites and F-ions substituted O in the crystal lattice. There were numerous positions the doping elements could occupy in the structure. Selected ionic configurations were used to qualitatively evaluate the role of doping elements in improving the Li-ion diffusivity and mobility.

Figure 5:
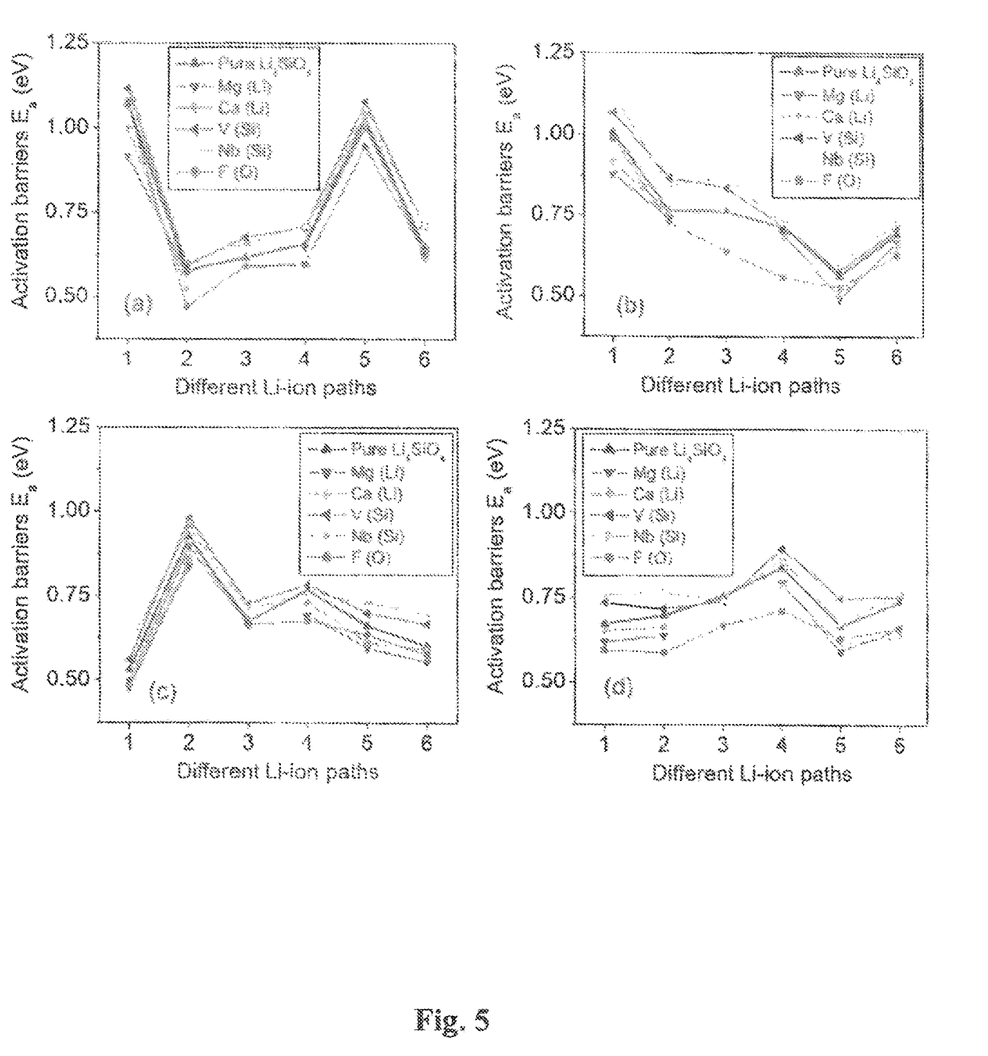
FIG. 5 includes plots that show calculated activation barriers $E_a$ in eV for the different crystallographic environments and different migration paths of Li-ions in pure and doped $Li_4SiO_4$, in accordance with certain embodiments of the invention.

Since the important parameter for the diffusion evaluation was the activation barrier $E_a$ of the paths between their initial and final Li-ion positions, $E_a$ for different atomic configurations are illustrated in FIG. 5 where four different local environments of Li-ion are shown in the insets of the corresponding graphs.

It was observed that the introduction of different elements resulted in different changes in heights of the activation barriers. Doping of Mg, Ca and F consistently decreased the $E_a$ values, thus improving the Li-ion diffusivity, while introduction of V and Nb made Li-hopping more energetically demanding which deteriorated the overall ionic mobility. It may be qualitatively explained by considering two factors: (1) the ionic radii of the doping elements in comparison to the values of the corresponding ionic radii of the un-doped $Li_4SiO_4$ and (2) change of the electrostatic interactions between $Li^+$ and corresponding substituted ions of the doping elements. The elements that improved the mobility, such as $Mg^{2+}$ and $F^-$, had smaller ionic sizes than their counterparts $Li^+$ and $O^{2-}$ (0.72 Å vs. 0.76 Å and 1.33 Å vs 1.4 Å for Mg, Li, F and O, respectively), which contributed to lowering the activation barriers due to enlarging structural channels for Li-hopping between the two adjacent sites. The opposite effect of $V^{5+}$ and $Nb^{5+}$ occurred due to their significantly larger ionic sizes in comparison to $Si^{4+}$ (0.355 Å and 0.48 Å vs. 0.26 Å for V, Nb, and Si, respectively). As for the electrostatic interactions between the moving Li-ion and its neighbor atoms, an increase of the ionic charge of the doped atoms from +2 to +3 or from +4 to +5 was expected to increase the electrostatic repulsion and thus, make the movement of the trial $Li^{2+}$ ion more energetically demanding resulting in lowering the Li-mobility.

It was observed that these two factors worked in the same direction for $F^-$ (smaller size, lower ionic charge), and for $V^{5+}$, $Nb^{5+}$, and $Ca^{2+}$ (larger size, higher ionic charge). For $Mg^{2+}$ the factors worked oppositely (smaller size, higher ionic charge). An introduction of F decreased the activation barrier $E_a$ as shown in FIG. 5. Also, V and Nb noticeably increased $E_a$, thus supporting the abovementioned concept of the two factors. Although $Mg^{2+}$ had a higher ionic charge, it had a smaller ionic radius than $Li^+$ which most likely was the decisive factor contributing to determining the overall ionic mobility. As for $Ca^{2+}$, its ionic radius and charge were larger than that of $Li^+$ and its introduction into $Li_4SiO_4$ should not have contributed to facilitating energetics of the Li-mobility according to the abovementioned speculations, which is in contradiction with calculated results shown on FIG. 5.

Using Equation 1 for estimation of the diffusivity coefficient with doping elements, the lowest calculated activation barriers $E_a$ among the four minimal values shown in FIG. 5 a-d, were chosen. For three of the four different atomic configurations, the minimal $E_a$ value was ~0.45 eV, which gave the diffusion coefficient D(T) of ~2.4×10$^{-10}$ cm$^2$/s at room temperature T=300° K, which was 300 times higher than the corresponding D(T) calculated for un-doped $Li_4SiO_4$ (~7.2×10$^{-13}$ cm$^2$/s).

Thus, the results suggested the use of Mg, Ca, and F as doping elements for improving Li-ion mobility and ionic conductivity of $Li_4SiO_4$ by 2-3 orders of magnitude. Pure and doped lithium orthosilicates were then synthesized and ionic conductivity measured as described in the following Example.

II. Experimental Methods

A. Experiments:

The raw materials used included lithium acetate dihydrate ($CH_3COOLi \cdot 2H_2O$, 99.99% trace metals basis), calcium acetate hydrate (($CH_3COO$)$_2Ca \cdot xH_2O$, 99.99% trace metals basis), magnesium acetate tetrahydrate (($CH_3COO$)$_2$Mg·4H2O, 99.99% trace metals basis, silica ($SiO_2$, fumed) and lithium fluoride (LiF, ≥99.99% trace metals basis) purchased from Sigma Aldrich.

For the synthesis of calcium and magnesium doped $Li_4SiO_4$, stoichiometric quantities of the raw materials were dispersed in methanol, the quantity of which was adjusted to get 1M $Li^+$ concentration. The solution was then slowly heated at 60° C. under continuous stirring to evaporate methanol. The resulting powder was then heated at 950° C. for 12 h in an alumina crucible. The heating and cooling rates were set at 5° C./min and 1° C./min, respectively. $Li_4SiO_4$ was doped with fluorine using similar methods except that the final temperature was set at 850° C.

B. X-Ray Characterization:

XRD analysis of the powder samples was performed using Philips XPERT PRO system equipped with a monochromator that employs CuK$_\alpha$ ($\lambda$=0.15406 nm) with a 45 kV operating voltage and 40 mA operating current. The 2θ value was varied from 10 to 90° with a step size of 0.04°.

C. Electrochemical Impedance Analysis:

For ionic conductivity measurements, Li$_4$SiO$_4$ and the doped compounds were made into 2 mm-thick pellets using a 13 mm-diameter die by applying a uniform pressure of 5 MPa for 5 minutes. The pellets were then sintered at 950° C. for 4 hrs. CR 2032 type coin cells were assembled by embedding these pellets between two lithium foils. The AC impedance measurements were performed at 25° C., over a frequency range of 0.01 Hz to 100 kHz at 10 mA amplitude. The impedance spectra obtained experimentally were interpreted and analyzed using Z-View (Scribner Associates, Inc.; version 3.3c).

III. Experimental Results and Discussion

Figure 6:
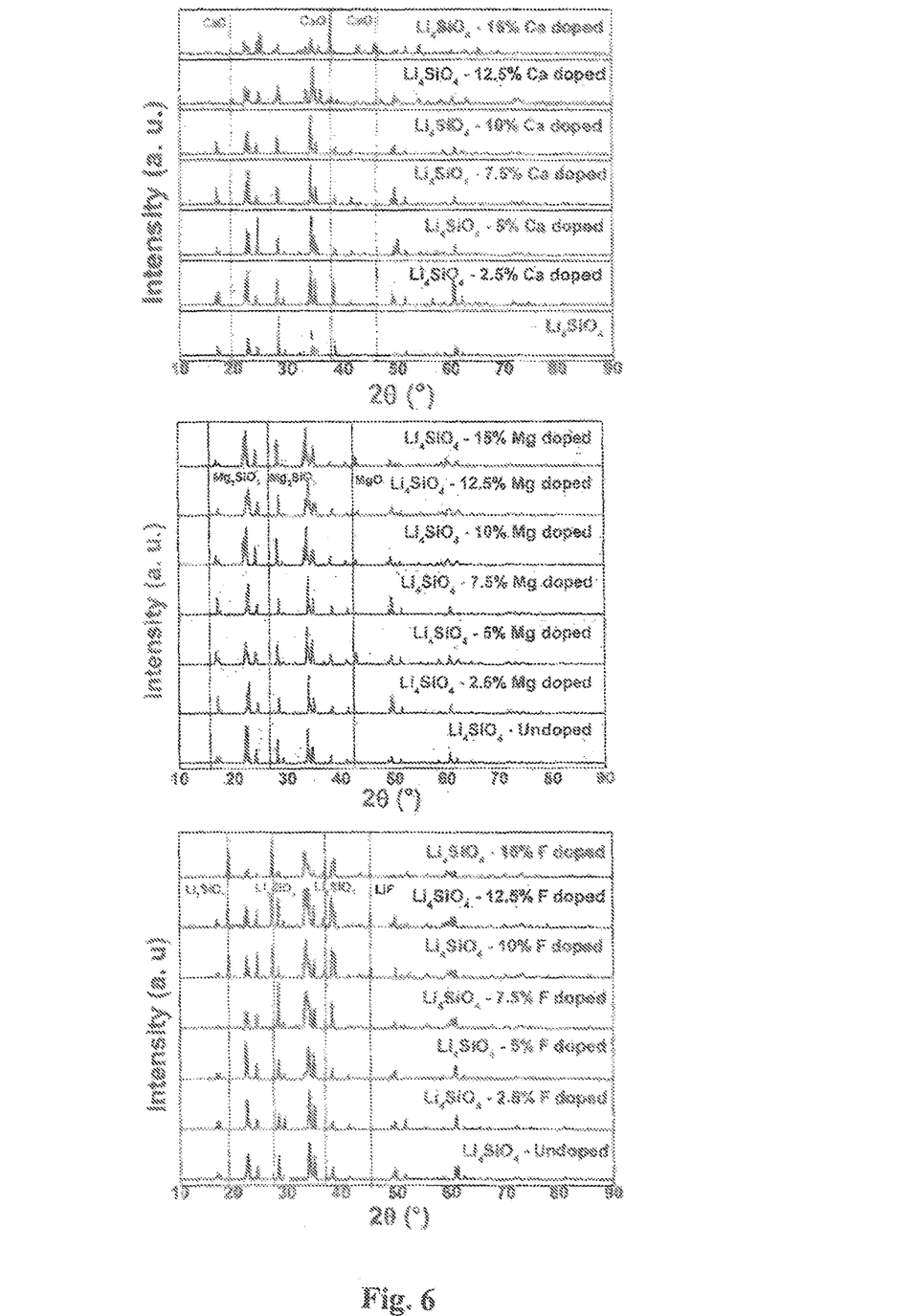
FIG. 6 is an XRD spectra of calcium-, magnesium- and fluorine-doped $Li_4SiO_4$, in accordance with certain embodiments of the invention.

FIGS. 6a-c show the XRD patterns of calcium, magnesium and fluorine doped lithium orthosilicate. Doping does not alter the monoclinic lattice structure of Li$_4$SiO$_4$ at low doping concentrations. A maximum of 7.5% lithium sites were successfully doped with the divalent cations of calcium and magnesium. Further, increased dopant concentration resulted in the formation of CaO secondary phases in the case of calcium doping (FIG. 6a) and Mg$_2$SiO$_3$ and MgO in the case of magnesium doping (FIG. 6b). In contrast, up to 10% oxygen sites were replaced with monovalent fluoride ions maintaining the crystal's phase purity, secondary phases of Li$_4$SiO$_3$ and LiF began to appear upon excessive doping.

Figure 7:
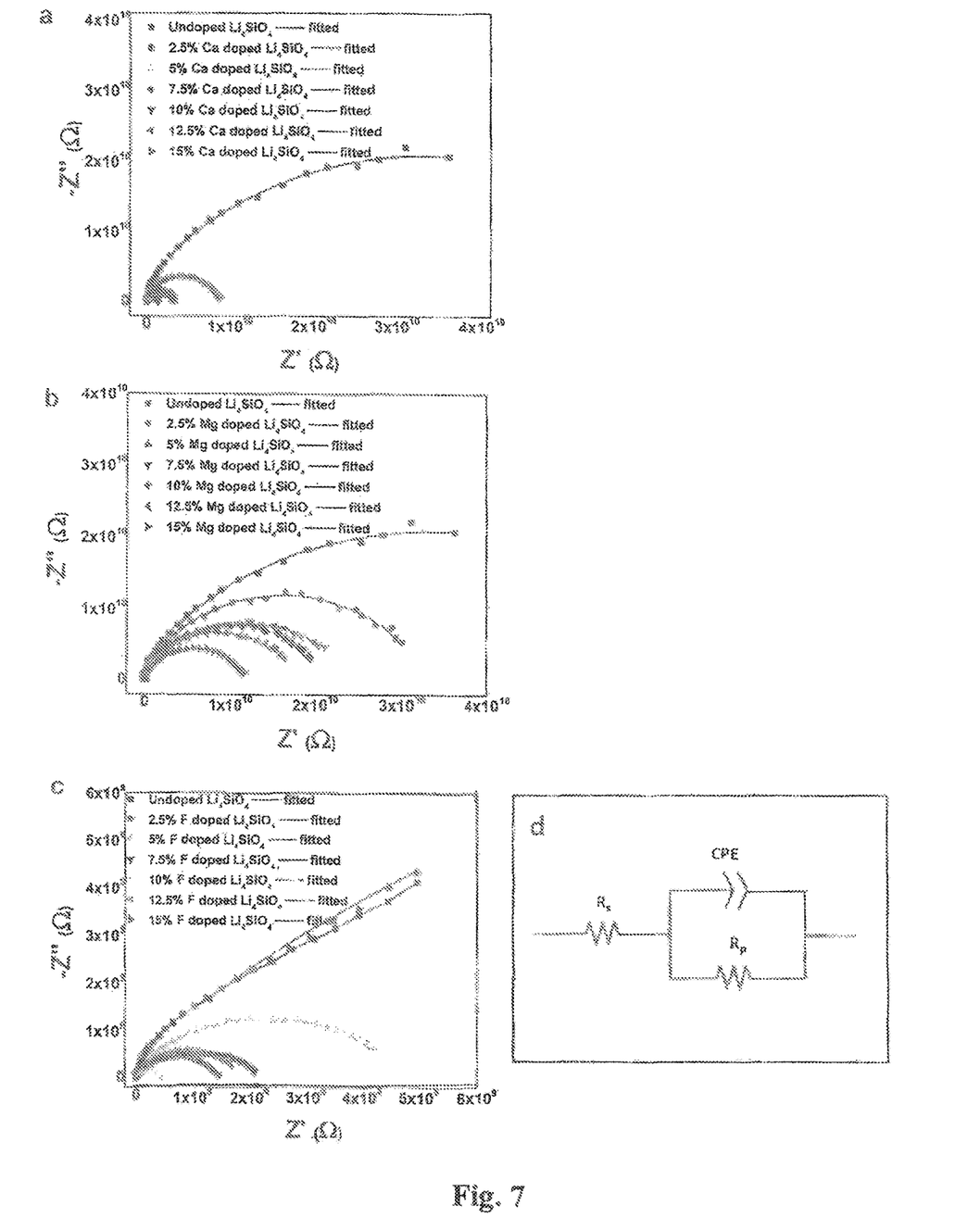

The complex impedance is plotted in a complex plane with real versus imaginary as indicated by the Cole-Cole plot. FIGS. 7a-c shows the experimental impedance results of the three doped orthosilicates. As clearly shown in FIG. 7a-c, the impedance data of calcium, magnesium and fluorine doped orthosilicates are very similar. The semicircle in the impedance plots at higher frequencies is due to bulk ionic conduction and the spikes at low frequency are due to the secondary ionic carrier, grain-boundary diffusion in powder samples or surface ion diffusion. It was suggested that the spikes at low frequencies in this case are due to electrode surface effects which was also observed in other single crystal impedance measurements.

The simplest equivalent circuit for a Cole-Cole plot is a RC parallel circuit whose impedance is given by Equation 2:

$$Z_{R\|C} = \frac{R - i\omega CR}{1 + \omega^2 C^2 R^2} \tag{2}$$

in which ω is the angular frequency with ω=2πf. The corresponding Cole-Cole plot is a semicircle, whose diameter is equal to R, and the angular frequency $\omega_p$ at which the peak occurs obey to the equation: $\omega_p$=1/RC. The Cole-Cole plots are typically partial semicircles, which can be numerically fitted by using a simple RC circuit. However, the Cole-Cole plots spike at lower frequency is usually due to the surface roughness. The Cole-Cole plots in such cases could be simulated by an RC circuit in series with a Constant-Phase element (CPE), whose complex impedance is given by Equation 3:

$$Z_{CPE} = Af^{-n}\left(\cos\frac{n\pi}{2} - i\sin\frac{n\pi}{2}\right) \tag{3}$$

which produces a straight line with an angle of nπ/2 with the R axis in the Cole-Cole plot.

The numerical fit of the equivalent circuit to the experimental Cole-Cole plot was done by fitting the frequency dependent real part and the imaginary part of the equations to the experimental data. The fit resulted from the real part and the imaginary part being very close. In this work, the fits were done by using the Zview™ software package from 12 Hz to 10000 Hz. FIG. 7d shows the simple equivalent circuit used to fit the experimental results, where Rs represents the contact resistance inside the cell, Rp represents the resistance to lithium ion mobility and CPE is the constant phase element arising from the dielectric capacitance across the solid electrolyte. The fitted values of Rs, Rp, CPE-T and CPE-P are tabulated in Table 1S-Table 3S (T1S-T3S).

TABLE 1S

Fitted results of Ca substituted orthosilicate (Each datum represents an average of three independent tests run on three different samples under identical conditions.)

| % Ca doped | $R_s$ (Ohm) | CPE-T × $10^{11}$ | CPE-P | $R_p$ (Ohm) | Conductivity × $10^{12}$ (S/cm) |
|---|---|---|---|---|---|
| 0 | 1.70 ± 0.21 | 5.26 ± 0.32 | 0.78 ± 0.05 | 1.29 ± 0.21E+11 | 1.17 ± 0.25 |
| 2.5 | 2.57 ± 0.35 | 5.14 ± 0.27 | 0.79 ± 0.05 | 3.07 ± 0.42E+09 | 49.14 ± 13.62 |
| 5 | 3.06 ± 0.26 | 3.87 ± 0.46 | 0.94 ± 0.09 | 1.29 ± 0.17E+08 | 1169.55 ± 292.65 |
| 7.5 | 8.47 ± 0.76 | 5.19 ± 0.28 | 0.70 ± 0.12 | 5.25 ± 0.73E+06 | 28706.07 ± 8000.53 |
| 10 | 1.12 ± 0.08 | 4.11 ± 0.54 | 0.81 ± 0.04 | 1.26 ± 0.20E+09 | 119.27 ± 37.34 |
| 12.5 | 9.85 ± 0.62 | 4.15 ± 0.63 | 0.82 ± 0.05 | 3.34 ± 0.45E+09 | 45.08 ± 11.4 |
| 15 | 1.40 ± 0.07 | 4.29 ± 0.54 | 0.79 ± 0.03 | 9.12 ± 1.12E+09 | 16.54 ± 3.8 |

TABLE 2S

Fitted results of Mg substituted orthosilicate (Each datum represents an average of three independent tests run on three different samples under identical conditions.)

| % Mg doped | $R_s$ (Ohm) | CPE-T × $10^{11}$ | CPE-P | $R_p$ (Ohm) | Conductivity × $10^{12}$ (S/cm) |
|---|---|---|---|---|---|
| 0 | 1.91 ± 0.09 | 3.59 ± 0.29 | 0.79 ± 0.06 | 7.82 ± 0.82E+10 | 1.19 ± 0.32 |
| 2.5 | 5.24 ± 0.46 | 9.53 ± 1.02 | 0.76 ± 0.04 | 3.39 ± 0.28E+10 | 4.45 ± 0.72 |

TABLE 2S-continued

Fitted results of Mg substituted orthosilicate (Each datum represents an average of three independent tests run on three different samples under identical conditions.)

| % Mg doped | $R_s$ (Ohm) | CPE-T × $10^{11}$ | CPE-P | $R_p$ (Ohm) | Conductivity × $10^{12}$ (S/cm) |
|---|---|---|---|---|---|
| 5 | 1.36 ± 0.05 | 5.67 ± 0.84 | 0.85 ± 0.05 | 8.22 ± 0.96E+08 | 183.51 ± 37.40 |
| 7.5 | 7.44 ± 0.82 | 7.16 ± 0.68 | 0.84 ± 0.10 | 1.18 ± 0.15E+08 | 1277.59 ± 275.72 |
| 10 | 1.39 ± 0.23 | 9.80 ± 1.16 | 0.83 ± 0.09 | 2.09 ± 0.26E+10 | 7.23 ± 1.62 |
| 12.5 | 1.69 ± 0.07 | 8.20 ± 0.85 | 0.83 ± 0.07 | 5.14 ± 0.35E+10 | 2.94 ± 0.70 |
| 15 | 1.78 ± 0.03 | 4.96 ± 0.28 | 0.86 ± 0.04 | 5.37 ± 0.42E+10 | 2.81 ± 0.48 |

TABLE 3S

Fitted results of F substituted orthosilicate (Each datum represents an average of three independent tests run on three different samples under identical conditions.)

| % F doped | $R_s$ (Ohm) | CPE-T × $10^{10}$ | CPE-P | $R_p$ (Ohm) | Conductivity × $10^{12}$ (S/cm) |
|---|---|---|---|---|---|
| 0 | 3.54 ± 0.54 | 1.16 ± 0.09 | 0.76 ± 0.04 | 1.26 ± 0.20E+11 | 1.19 ± 0.32 |
| 2.5 | 2.40 ± 0.12 | 1.59 ± 0.21 | 0.79 ± 0.06 | 7.52 ± 0.63E+09 | 20.04 ± 6.60 |
| 5 | 1.32 ± 0.06 | 1.67 ± 0.08 | 0.81 ± 0.06 | 4.96 ± 0.55E+09 | 30.41 ± 8.50 |
| 7.5 | 1.01 ± 0.02 | 2.06 ± 0.29 | 0.76 ± 0.08 | 2.39 ± 0.19E+09 | 63.13 ± 10.41 |
| 10 | 3.08 ± 0.21 | 2.01 ± 0.08 | 0.71 ± 0.02 | 4.19 ± 0.32E+08 | 359.63 ± 54.34 |
| 12.5 | 1.43 ± 0.07 | 1.63 ± 0.12 | 0.70 ± 0.06 | 1.96 ± 0.19E+09 | 76.95 ± 15.42 |
| 15 | 1.27 ± 0.08 | 1.47 ± 0.06 | 0.79 ± 0.04 | 3.23 ± 0.42E+10 | 4.66 ± 0.87 |

The fitted value of $R_p$ was used to calculate the lithium ionic conductivity ($\sigma$) of the doped orthosilicates using Equation 4:

$$\sigma = \frac{1}{R_p} \times \frac{t}{S} \quad (4)$$

wherein $R_p$ is the resistance, t is the thickness and S is the surface area of the orthosilicates, respectively.

Figure 8:
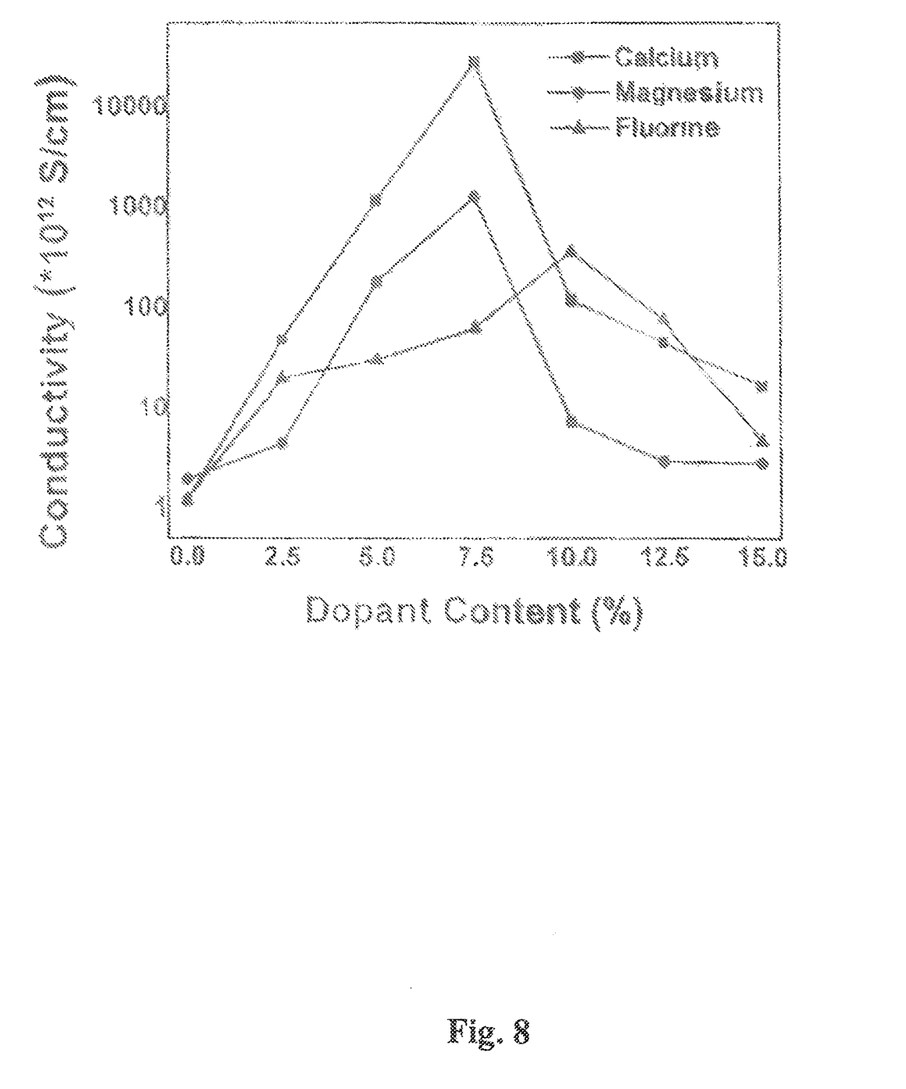
FIG. 8 is a plot showing a comparison of the effect of calcium, magnesium and fluorine doping on the ionic conductivity of $Li_4SiO_4$, in accordance with certain embodiments of the invention.

The lithium ion conductivities of calcium, magnesium and fluorine doped orthosilicates at ambient temperature are plotted in FIG. 8. The lithium ion conductivity of un-doped $Li_4SiO_4$ was $1.17 \times 10^{-12}$ S/cm. Upon doping, the ionic conductivity increased by 3-4 orders due to the introduction of $Li^+$ vacancies as previously explained by DFT calculation. The doped orthosilicates increased in ionic conductivity up to 7.5% for calcium and magnesium doping and 10% for fluorine doping. The ionic conductivity of lithium orthosilicates increased to $2.87 \times 10^{-8}$ S/cm and $1.27 \times 10^{-9}$ S/cm upon 7.5% doping of calcium and magnesium, respectively. Upon 10% doping of fluorine, the lithium ionic conductivity increased to $3.59 \times 10^{-10}$ S/cm. The ionic conductivities decreased at higher dopant concentrations due to the formation of impure secondary phases as shown by XRD. This could be explained by the introduction of grain boundaries by the secondary phases formed at higher dopant concentrations.

CONCLUSIONS

Density Function Theory (DFT) suggested that doping $Li_4SiO_4$ with different aliovalent elements contributed to creating ionic vacancies in the crystal structure, facilitating Li migration and improving the overall ionic conductivity. The theoretical study also suggested the use of Mg, Ca, and F as dopants improved the Li-ion mobility and ionic conductivity of $Li_4SiO_4$ on 2-3 orders of magnitude. To provide confirmation and validation, $Li_4SiO_4$ was doped with six different concentrations of each of the dopants using a high temperature solid diffusion technique. A maximum of 7.5 atomic % of $Li^+$ sites were doped with $Ca^{2+}$ and $Mg^{2+}$ ions, and 10% of the $O^{2-}$ sites were doped with $F^-$ ions with phase purity. The Electrochemical Impedance Spectroscopy (EIS) analysis results showed that the doping improved the ionic conductivity of $Li_4SiO_4$ by 3-4 orders of magnitude. $Ca^{2+}$ doping showed the maximum improvement in ionic conductivity from $1.179 \times 10^{-12}$ S cm$^{-1}$ to $2.870 \times 10^{-8}$ S cm$^{-1}$. This improvement in lithium ionic conductivity upon doping may provide for the development of all solid-state lithium batteries with oxide-based solid electrolytes.

The invention claimed is:
1. A lithium ion battery anode, comprising:
 a multilayer composite, comprising:
  a porous, lithium-based metal alloy foam, comprising:
   pores, comprising:
    lithium ions deposited in the pores; and
   a structurally isomorphous alloy, comprising:
    lithium; and
  a lithium ion conductor coating applied to the porous, lithium-based metal alloy foam, the coating comprising:
   ternary lithium silicate; and
   dopant selected from the group consisting of magnesium, calcium, vanadium, niobium, fluorine, or mixtures or combinations thereof, wherein, the multilayer composite is structured to reduce growth of dendrites on the lithium ion battery anode as compared to a lithium battery anode absent the porous, lithium-based metal alloy foam and lithium ion conductor coating.

2. The composite of claim 1, wherein the structurally isomorphous alloy of lithium further comprises a solid solution of magnesium.

3. The composite of claim 2, wherein the structurally isomorphous alloy of lithium comprises at least one element selected from the group consisting of zinc, aluminum, yttrium, calcium, strontium, iron and silver.

4. The composite of claim 1, wherein the ternary lithium silicate is lithium orthosilicate.

5. The composite of claim 1, wherein the dopant interacts with a site in the ternary lithium silicate selected from the group consisting of lithium ion, oxygen atom, silicon atom, and combinations thereof.

6. The composite of claim 5, wherein the dopant interacts with the lithium ion and the dopant is selected from the group consisting of calcium, magnesium, and mixtures and combinations thereof.

7. The composite of claim 5, wherein the dopant interacts with the oxygen atom and the dopant is fluorine.

8. The composite of claim 5, wherein the dopant interacts with the silicon atom and the dopant is selected from the group consisting of vanadium, niobium, and mixtures and combinations thereof.

9. A method of preparing a lithium ion battery anode, comprising:
   preparing a multilayer composite, comprising:
      forming a porous, lithium-based metal alloy foam, comprising:
         pores, comprising:
            lithium ions deposited in the pores; and
         a structurally isomorphous alloy, comprising:
            lithium;
      applying a lithium ion conductor coating to the porous, lithium-based metal alloy foam, the coating comprising ternary lithium silicate; and
      doping one or more sites of the lithium ion conductor coating with dopant selected from the group consisting of magnesium, calcium, vanadium, niobium, fluorine, or mixtures or combinations thereof,
      wherein the one or more sites are selected from the group consisting of lithium ion, oxygen atom and silicon atom, and
      wherein, the composite effectively reduces growth of dendrites on the lithium ion battery anode as compared to a lithium battery anode absent the porous, lithium-based foam and lithium ion conductor coating.

10. The composite of claim 1, wherein the porous, lithium-based metal alloy foam is deposited on a metal current collector.

11. The method of claim 9, further comprising depositing the porous, lithium-based metal alloy foam on a metal current collector.

* * * * *